United States Patent [19]

Burg

[11] 3,958,028

[45] May 18, 1976

[54] LOW TEMPERATURE HYPOBARIC STORAGE OF METABOLICALLY ACTIVE MATTER

[75] Inventor: Stanley P. Burg, Miami, Fla.

[73] Assignee: Grumman Allied Industries, Inc., Garden City, N.Y.

[22] Filed: Aug. 26, 1974

[21] Appl. No.: 500,449

Related U.S. Application Data

[63] Continuation-in-part of Ser. No. 245,886, April 20, 1972, abandoned.

[52] U.S. Cl.............................. 426/418; 426/419; 162/20; 162/30 R; 62/268; 47/58
[51] Int. Cl.²....................... A23L 3/36; A23B 4/06; A23B 7/04; A01N 3/02
[58] Field of Search.................... 426/418, 419, 312; 162/20, 30; 62/268; 47/58

[56] References Cited
UNITED STATES PATENTS

| | | | |
|---|---|---|---|
| 2,987,404 | 6/1961 | Beckmann | 426/418 |
| 3,102,777 | 9/1963 | Bedrosian | 426/418 |
| 3,810,508 | 5/1974 | Burg | 165/20 |

*Primary Examiner*—Jeanette M. Hunter
*Attorney, Agent, or Firm*—Bosworth, Sessions & McCoy

[57] ABSTRACT

The preservation of metabolically active matter such as fruit, vegetables, meat, fowl, shrimp, fish, other food, cut flowers, cuttings, foliage plants and the like is disclosed, characterized by storage at controlled and correlated conditions of hypobaric pressure, temperature, humidity, air circulation and air exchange. A non-deleterious gas such as air is humidified by contacting it with heated water from a supply, and then the humid air is passed through, and when advisable, recirculated and/or rehumidified within a storage chamber containing the metabolically active matter. The relative humidity is maintained within the range of about 80 to 100% and the pressure is maintained continuously or intermittently at a selected value at least slightly higher than the vapor pressure of the water in the stored commodity.

32 Claims, 2 Drawing Figures

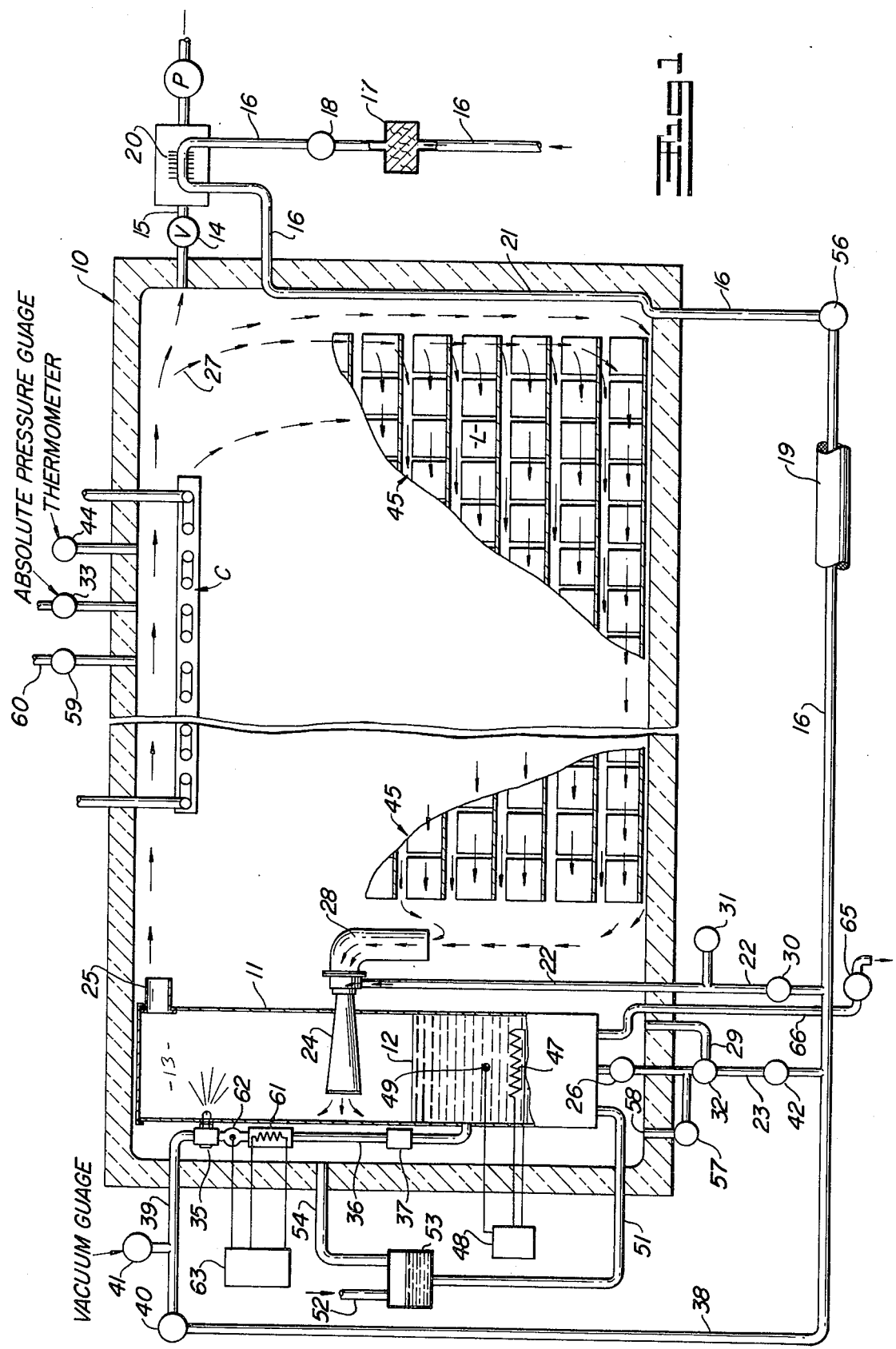

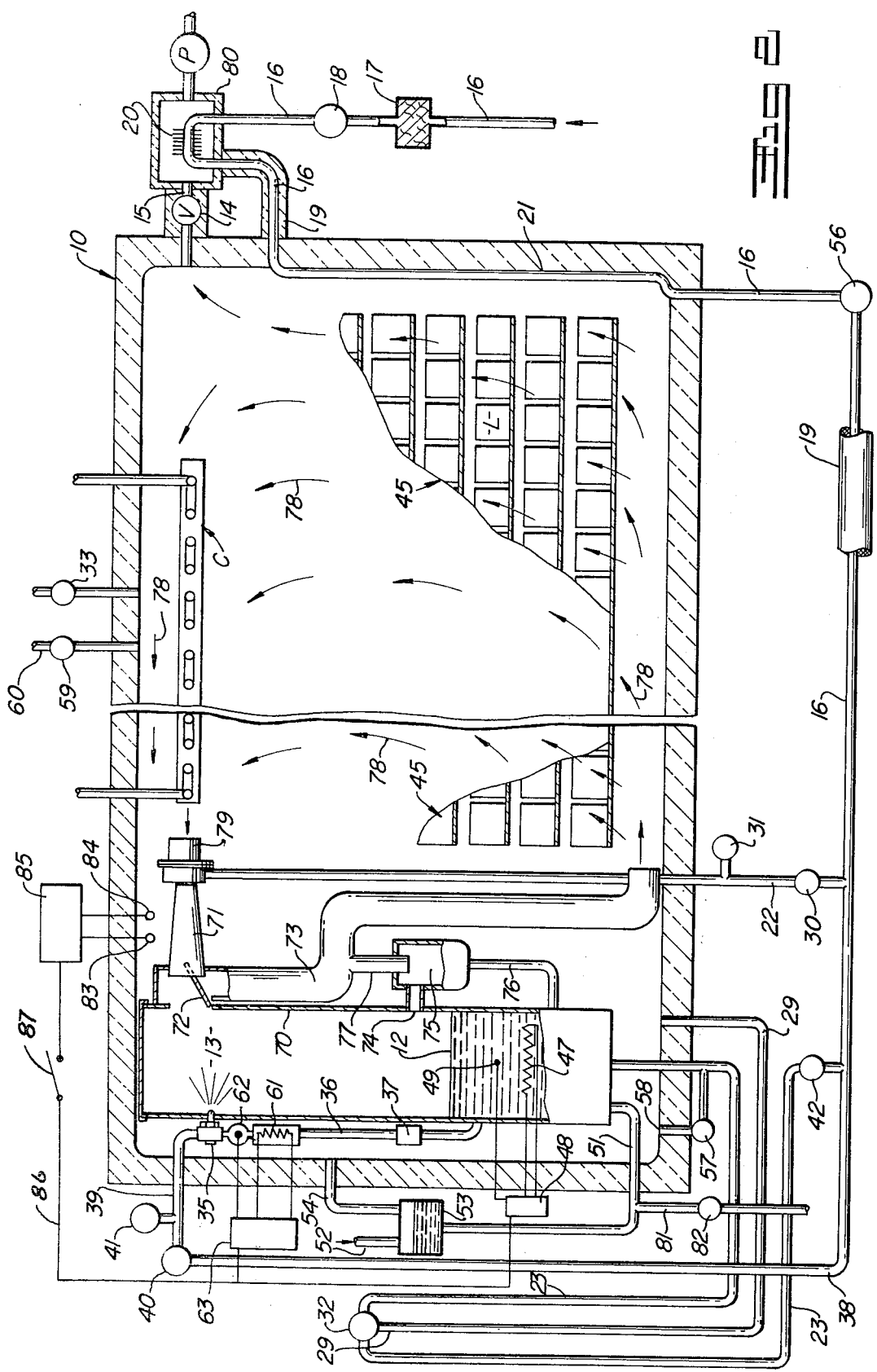

LOW TEMPERATURE HYPOBARIC STORAGE OF METABOLICALLY ACTIVE MATTER

CROSS-REFERENCE TO RELATED APPLICATIONS

This application is a continuation-in-part of my pending application filed in my name, Stanley P. Burg, on 20th April 1972, Ser. No. 245,886, entitled "Low Temperature Hypobaric Storage of Non-Mineral Matter"- now abandoned. Certain aspects of this application are related to the joint U.S. patent applications filed in my name, Stanley P. Burg, and William J. Hentschel, entitled "Low Pressure Storage of Metabolically Active Material with Open Cycle Refrigeration", filed Jan. 5, 1972, Ser. No. 215,688, now issued in U.S. Pat. NO. 3,810,508, and a division thereof filed March 26, 1974, Ser. No. 454,825 now U.S. Pat. No. 3,913,661. This application is also related to U.S. Pat. No. 3,333,967 and my copending application for reissue thereof filed Mar. 26, 1973, Ser. NO. 345,182.

BACKGROUND OF THE INVENTION

In my prior U.S. Pat. No. 3,333,967, a method is disclosed for preserving mature but less than fully ripe fruit which produce ethylene and are ripened thereby, using hypobaric conditions of about 100 to 400 millimeters of mercury (mm Hg) absolute pressure in nearly water-saturated, moving air to facilitate the diffusive escape of ethylene from the commodity without loss of water therefrom. This method was first discovered to give useful results on a laboratory scale, and later under favorable commercial conditions on a larger scale, with non-ripe, mature fruit such as avocados, limes, and especially bananas. Upon later study and research I discovered that hypobaric, i.e. low absolute pressure, storage is valuable for reasons in addition to promoting the diffusive escape of ethylene from stored commodities, and that consequently the method is applicable to a wide variety of metabolically active matter other than that which is influenced by ethylene. In some instances, for example meat, it presently appears that the efficacy of the method is due to a reduction in oxygen partial pressure which attends the pressure reduction, as well as to enhanced diffusive escape of volatile off-odors, but with other commodities more is involved. For example, the foliage of chrysanthemums produce large quantities of ethylene and is not affected by the gas, yet it responds well to hypobaric but not low-oxygen, atmospheric pressure storage. I also learned how to overcome several problems and difficulties which had restricted the use of the hypobaric method to pressures higher than the 100 mm Hg. limit described and claimed in my U.S. Pat. NO. 3,333,967.

It is known as in Bonomi's Br. Patent No. 822,904 that at atmospheric pressure, many forms of metabolically active matter ferment and are spoiled by the accumulated waste products of anaerobic respiration if continuously exposed to less than 3% oxygen. This happens to be equivalent to the oxygen partial pressure in air at 100 mm Hg. absolute pressure. Bonomi teaches only superatmospheric pressures between about 832–905 mm Hg. absolute and subatmospheric pressures between about 687–650 mm Hg. absolute: quite remote from my hypobaric method.

Heat exchange is so limited by the decreased heat capacity of air at pressures lower than 100 mm Hg. that it is not possible to cool a commodity and maintain it at a uniform temperature in dry air under these conditions. Indeed, at some low pressure which is unpredictable because it is determined in part by the geometry of the apparatus, the Dewar effect sets in and prevents all conductive heat transfer. I have discovered that the Dewar effect does not influence heat transfer in a commercially sized hypobaric trailer at pressures as low as 8 mm Hg., that conductive heat exchange can be kept at a satisfactory value at pressures lower than 100 mm Hg. by saturating the atmosphere with water vapor, that certain of the deleterious effects of too low an oxygen partial pressure can be obviated with advantage by periodically cycling the pressure back to atmospheric, and that fermentative waste products, being volatile compounds can be in part removed under hypobaric conditions.

These discoveries and improvements have enabled me to use the hypobaric process at pressures lower than 100 mm Hg., and thereby to increase its efficacy with certain commodities and extend its utility to other commodities. I have found that at pressures lower than 100 mm Hg., and especially below 50 mm Hg., even though the atmosphere is kept fully saturated with water vapor, commodity desiccation may occur because the commodity respires and thereby is slightly warmer than the surrounding atmosphere. The higher temperature causes the vapor pressure of water in the commodities to be greater than that in the surrounding air. At a low pressure the rate of diffusion of water vapor is so enhanced that the slight tendency for water movement from the commodity to the atmosphere, created by the vapor pressure differential, is greatly magnified. I learned that the use of certain water retentive plastic wraps suffices to prevent desiccation under these conditions, but the atmosphere still must be kept saturated with water, for the rate of passage of water vapor through the wraps is enhanced considerably when the pressure is lowered, thus rendering these moisture barriers far less efficient than if they are used at atmospheric pressure.

Another problem which becomes increasingly important as the pressure is reduced, especially below about 100 mm Hg., is evaporative cooling of the humidifying water. Upon enlarging the size of the hypobaric storage chamber to large commercial proportions, I learned that, because of this evaporative cooling effect, the said method and means disclosed in my U.S. Pat. No. 3,333,967 under various unfavorable conditions could fail to provide or maintain the high relative humidity that presently seems important for successful operation without a much reduced air through-flow.

I have now discovered how to use and profit by, and avoid deleterious consequences of, the refrigeration effect incident to free air expansion and water evaporation when air is bubbled through a body of humidifying water which is relatively smaller in relation to the whole storage space than was the body of water in relation to the size of a conventional laboratory vacuum vessel. While this cooling, often or sometimes, is desirable to lessen the work of, or eliminate other ways and means of cooling the chamber, refrigerating by evaporation of water runs counter to the objective of creating and maintaining high humidity. As the water cools, its vapor pressure is lowered and it tends to add progressively less water vapor to the incoming air so that the relative humidity in the chamber is reduced. In extreme cases, such as storage conditions near 0°C, the water of the humidifier can freeze because of evaporative cooling.

SUMMARY OF THE INVENTION

Maintaining the temperature of the humidifying water and make-up air in an advantageous relation to that of the air in the hypobaric chamber in order to provide a constant high relative humidity within the chamber is one of the objects of my invention. By preconditioning the make-up air to a temperature close to that in the hypobaric chamber, and heating the water to a higher temperature, the control of humidity within the chamber is made independent of ambient conditions and the evaporative cooling effect.

I have discovered that a relatively broad spectrum of correlated hypobaric pressures and low temperatures at high relative humidity is operational in preserving metabolically active matter, different classes of which vary markedly in their required or permissible storage conditions for best results. I find that pressure and temperature often interact in such a way that each factor influences the lowest and/or highest permissible value of the other which is needed to create the most beneficial storage condition. It presently appears that the best combination of these and other factors can be determined only by carefully ccontrolled tests.

A primary object of the invention is to provide optimal, correlated conditions of temperature, pressure, humidity and air movement for storing different categories, respectively of metabolically active matter. In the present method, a preferred correlation dependent upon the nature of the stored matter is established and maintained between ranges and continuities of temperature, air flow, air recirculation, hypobaric pressure and humidity. My reference herein to air and humidified air will comprehend equivalent non-deleterious gases and humidified gases unless otherwise noted.

An object of my invention is to improve upon my, and all other, prior patents, and extend the field of usefulness and the benefits and advantages of humid, subatmospheric cold storage, to the preservation of metabolically active matter, produce and commodities beyond the contemplation and facility of the teaching of the prior art.

Other objects, improvements and advantages will appear herein, reference being made to illustrative examples in the following pages, and to the attached drawings.

BRIEF DESCRIPTION OF THE DRAWINGS

In the accompanying drawing:

FIG. 1 is in part a schematic flow diagram and in part a diagrammaticc representation of one form of chamber or container and apparatus embodying and/or for practicing my invention; and FIG. 2 is a flow diagram and representation like FIG. 1 of another form of chamber or container, and apparatus.

DESCRIPTION OF THE PREFERRED EMBODIMENTS

In general, there are at least five factors or conditions mutually influencing the storage of metabolically active matter (hereinafter "MAM") in my hypobaric system, namely:

1. The kind or category of the stored MAM.
2. Air pressure in the storage chamber as may be maintained continuously or intermittently.
3. Air temperature in the storage chamber.
4. Relative humidity of the air in the storage chamber.
5. Rate of air flow into and out of the storage chamber, and circulation, recirculation and/or rehumidification of air therein.

Additional factors that in some instances influence storage at hypobaric pressures principally below 100 mm Hg. include the use of water retentive means to wrap the commodity, and the periodic or occasional cycling of pressure between hypobaric and atmospheric.

There is a relatively broad operational range of cool-to-cold temperatures, hypobaric pressures, high humidity and air movement rates in which most MAM can be stored advantageously as compared with atmospheric conditions and those described in my prior U.S. Pat. No. 3,333,967. Within these basic ranges, the nature of the commodity constituting the MAM determines optimum temperature, pressure, air flow and air recirculation conditions which can differ widely for different kinds of commodities. However, in all cases it presently appears that a desired high humidity level should be maintained to protect the commodity, regardless of other conditions. Although this humidity level preferably should be close to 100%, in cases such as storing limes, for example, a slightly lower humidity is often preferred to discourage the growth of molds. Gross air movement to and from the storage chamber removes deleterious gases which tend to be given off by and from the stored matter, but increasing the rate of through-flow of air tends to bear adversely on the maintenance of desirably high humidity because of the aforementioned evaporative cooling effect. Internal recirculation of air within the chamber facilitates rehumidification if the air is recycled through the humidification means, and improves heat transfer, insuring that all the stored contents of the chamber are bathed in about the same atmosphere and kept at a uniform temperature. Recirculation is particularly important during the initial stages of storage when field heat is being removed from the stored contents. On the other hand, increasing the rate of recirculation of air within the chamber tends to dry the organic matter, as described below, so that optimal storage usually is realized only at a specific range of air recirculation and/or through-put.

More particularly, my present improvement is applicable to a wide range of commodities including, in different classes or categories, not only mature but less than fully ripe fruit, but also ripe fruit, vegetables, cut flowers, potted plants, meat products, especially red meats such as beef and pork, and fowl such as chickens, shrimp, fish, vegetables and vegetative matter such as rooted and non-rooted cuttings, and still other metabolically active plant materials such as bulbs, corms, seeds, nuts, tubers, dried alfalfa pellets and the like. Such matter of different kinds and classes respectively may, as I have presently learned, be stored with advantage at pressures between about 4 mm Hg. and 400 mm Hg. absolute and at temperatures between about minus 2° to about plus 15°C with exceptions for particular kinds of matter and circumstances wherein the said upper limits of one or the other, temperature or pressure, may be exceeded advantageously; all taken with my preferred conditions of humidity and air movement. The minimum storage pressure, unless it is determined by oxygen availability, can be almost as low as the vapor pressure of water at the temperature of storage.

If the storage pressure were to reach the vapor pressure of water at the storage temperature, the water in the product and humidifier would boil and my method, as presently understood, would be impaired, if not rendered inoperable. Optimal correlated ranges of temperature, pressure, humidity and air movement within the herein stated ranges for specific commodities and/or classes of commodities are not readily predictable without careful experiment and research, preferably on both laboratory and commercial scales.

It is presently believed to be desirable to store commodities at the lowest temperature which does not cause chilling damage. Pressure may also play a role with respect to operable temperature because, at least in some cases, cold damage seems to be caused by accumulation of volatile metabolic products such as farnescece, alcohol, or acetaldehyde. Since hypobaric pressures tend to remove these products, they sometimes alleviate, delay or reduce the symptoms of cold damage and permit storage at temperatures which otherwise might impart cold damage. In other cases, because the oxygen partial pressure is reduced under hypobaric conditions, thereby favoring the fermentative production of many of the same substances which accumulate in response to cold damage, there is an increase of adverse cold temperature reactions such as peel pitting, and browning in certain fruits if the storage pressure is too low, whereas at high pressures the chilling effect still may be alleviated with the same commodity. For example, unwaxed Tahiti Persian limes keep their green color best if they are stored at 80 mm Hg. pressure and 9°C, but they experience chilling damage at that pressure and a temperature of 7°C. At 7°C they are best stored at 150 mm Hg., in which case they keep their green color without rind breakdown for many months. However, at that pressure they develop rind breakdown if the temperature is lowered to 5°C. In order to prevent rind breakdown at 5°C, the pressure must be elevated to 250 to 300 mm Hg., in which case the treated fruits experience less cold damage than fruits stored at atmospheric pressure and the same temperature. Similar results have been obtained with Marsh and Ruby red grapefruit. However, with bananas at temperatures lower than 12°C, cold damage is not enhanced but rather is alleviated as the pressure is reduced from 250 to 40 mm Hg. For these reasons it has not yet been possible for me to predict or extrapolate from studies of cold tolerance of one commodity under hypobaric conditions all the aspects of behavior that fact commodity will hypobaric conditions Similarly, I have found it difficult, if not impossible to predict or extrapolate directly from available studies of the chilling effect at reduced partial pressures of oxygen at standard conditions, what the effect, or corresponding effect, will be on storage at subatmospheric pressures. In part the lack of agreement between studies at atmospheric and subatmospheric pressure is due to the fact that under hypobaric conditions the rate of oxygen consumption appears to be different even though the oxygen partial pressure is the same. In both cases respiration and heat evolution are greatly reduced when the oxygen availability is restricted, but progressively the tissues stored under hypobaric conditions continue to decrease in respiration rate, ultimately reaching far lower values than comparable samples kept at the another oxygen partial exhibit. at atmospheric pressure. Moreover, most of the reduced-oxygen, atmospheric pressure studies in the prior art were carried out in air-tight or substantially air-tight containers wherein ethylene and respiratory carbon dioxide were permitted to accumulate to relatively high concentrations and to interact subsequently with each other and the oxygen in such a manner so as to render it difficult if not impossible to predict or extrapolate from these studies the behavior of commodities in renewing hypobaric atmospheres which remove carbon dioxide and ethylene.

I have also found it difficult if not impossible to predict or extrapolate from hypobaric studies in the pressure range of 100 to 400 mm Hg. whether the method is applicable to the pressure range of 4 to 100 mm Hg. (all pressures mentioned herein are absolute unless otherwise specified), and whether the lower range will be more beneficial than the higher range for various commodities. The reduction in oxygen availability by decreasing the pressure from 100 mm Hg. to about 4 mm Hg. causes two successive shifts in the type of microbial flora that may develop in the commodity and lead to decay and to the growth of pathogens that would render the commodity unfit for consumption. At 100 mm Hg. there is sufficient oxygen to support the growth of aerobic bacteria and molds but too much oxygen to support anaerobic bacteria, facultative anaerobic bacteria and microaerophylic bacteria. At about 40 to 50 mm Hg., the oxygen content reaches a level which inhibits the growth of aerobic bacteria and molds but promotes the growth of facultative anaerobes, microaerophylic organisms, and certain yeasts. If the pressure is reduced so that it approaches the vapor pressure of water at the storage temperature, anaerobic organisms develop and the growth of all other types is inhibited. The fact that numerous essential metabolites should boil from the tissue at −2° to 15°C in the 4 to 100 mm Hg range whereas few if any should boil in the 100 to 400 mm Hg. range further complicates the use of hypobaric data taken in the 100 to 400 mm Hg. range.

At a relative humidity of about, and above, 80% and at given storage temperatures as shown in examples below, MAM which I have noticed to be best stored in the 100 to 400 mm Hg. range tends to be mature but less than fully ripe bananas and limes as specified in my prior U.S. Pat. No. 3,333,967. Under certain conditions, as when the temperature is 10°C with limes, or less than 12°C with bananas, pressures lower than 100 mm Hg. may give slightly improved results. Departing from that patent I have now learned that fully ripe fruit, such as strawberries, cherries, grapefruits, tomatoes and blueberries, are well stored in the 80–400 mm Hg. range but at much lower temperatures. The storage of cut flowers is improved by pressures at and above 100 mm Hg., but markedly so at 25 to 70 mm Hg. While apples and pears may be stored in a pressure range of about 100 to 150 mm Hg., markedly improved results are obtained at pressures in the range of about 40 to 80 mm Hg. In general most non-ripe mature fruits are best stored at 50 to 80 mm Hg. Vegetative materials such as cuttings, rooted cuttings, and potted plants which I have examined store best with respect to pressure within the 40 to 80 mm Hg. range. Most vegetables except lettuce store best at a range within 50 to 80 mm Hg. Red meats, fish, poultry, and shrimp store best in the pressure range of 8 to 15 mm Hg. although the poultry and shrimp also benefit from slightly higher pressures.

In plant tissues a shift from the normal aerobic respiration to anaerobic fermentative respiration yielding carbon dioxide, acetaldehyde and alcohol, occurs in the pressure range of 4 to 100 mm Hg., just as it does at atmospheric pressure when the oxygen partial pressure is reduced to a comparable value, e.g. less than about 3%. If the oxygen level is maintained low enough for an extended period of time, the toxic end products of fermentation may accumulate in spite of the enhanced tendency for their diffusive escape, and eventually the commodity undergoes internal breakdown. However, the rate of diffusive oxygen entry into tissue under hypobaric conditions is so much more rapid that the oxygen concentration within the fruit is kept much closer in value to the external oxygen concentration than is the case at atmospheric pressure. Consequently fermentation occurs at a higher external oxygen partial pressure under atmospheric conditions.

In order to alleviate or prevent undesirable adaptation to the low oxygen environment and the resulting internal breakdown I have periodically cycled the absolute pressure from the selected running pressure up to atmospheric pressure to expose the commodity to a normal atmospheric oxygen level for the selected length of the cycle. With chrysanthemum cuttings the pressure was allowed to rise from 40 mm Hg. to atmospheric pressure for various selected periods of 2, 4, 6, 8, 10, 12 or 14 consecutive hours respectively, out of 24 hours each day. A very slight diminution in quality was noted with the 14 hour cycle but those cycled for 2 to 8 hours remained greener than cuttings kept under a continuous hypobaric pressure of 40 mm Hg. With mature green tomatoes at 13°C for 8 weeks, the pressure was allowed to rise from 80 mm Hg. to atmospheric pressure for 2, 4, 6 or 8 hours each day. Best results were obtained with a 4-hour cycle, which further reduced the rate of ripening and greatly decreased the incidence of decay compared to fruits kept at a continuous pressure of 80 mm Hg. for the same period of time.

Intermittent application of 8 hour periods, for example, of atmospheric pressure also permits an access to the storage chamber for introduction to and/or removal of to-be-stored or stored produce or other MAM to and from the chamber.

Classification of the various and numerous kinds and varieties of MAM in respect to the beneficience of their response to my presently preferred conditions of and for storage and preservation thereof within my improved method and means, will suggest itself from the preceding pages and the following numbered "Examples" and lettered "Tables". In these examples and tables, it is to be assumed that (1) the relative humidity was created and maintained above 80% and as high as practicable and desirable for the preservation and storage of the particular matter or produce as variously taught herein, (2) through-put of air in terms of volumes of the storage chamber per hour did not fall below an efficient and desirable minimum according to the precepts hereof, and (3) the rate of internal circulation of the humid atmosphere of the storage chamber sufficed to bathe all the stored contents of the chamber adequately and also to humidify or rehumidify said atmosphere to create and/or maintain the desired and most appropriate relative humidity in said chamber in view of the kind of matter or produce being preserved under the accompanying conditions of temperature and subatmospheric pressure which are specified in the several Examples and Tables.

The following examples are intended to illustrate my invention and are not intended to limit or impair the scope of the claims. Where reference is made below to "cold storage" as such, it is meant that such storage is old and conventional at atmospheric pressure, not LPS hypobaric, humid storage according to my present invention.

EXAMPLE 1

McIntosh, Red delicious, Golden delicious and Jonathan apples were stored at 60 mm Hg. and at 150 mm Hg., each batch at minus 1° to 2°C. Under normal cold storage conditions at these temperatures the different varieties may be kept for 2 to 4 months, except that in the case of McIntosh apples, chilling damage would be expected. After 6 months' storage at 60 mm Hg., all varieties still retained their initial firmness, color, flavor and shelf-life, whereas at 150 mm Hg. they had developed considerable aroma and were approaching full ripeness. After 8 months, fruits stored at 60 mm Hg. still retained at-harvest appearance, and had acquired a shelf-life after removal from storage which was considerably longer than that at harvest. Fruits stored at 150 mm Hg. were completely ripe at this time and their shelf-life foreshortened. At 60 mm Hg. the storage life of McIntosh apples is limited to about 6 months, at which time internal breakdown occurs. However, if the fruit is transferred to or subjected to cold storage (at atmospheric pressure as defined above) prior to that time, it can be kept for an even longer duration without internal breakdown, and subsequently ripens normally. In a companion experiment performed at 6°C, similar results were obtained for the apples except that the storage life at each pressure condition was vastly reduced compared to that at minus 1° to 2°C.

EXAMPLE 2

Bartlett, Clapp and Commice pears were stored at 60 mm Hg. and also at 150 mm Hg. and at minus 1° to plus 1°C. Under normal cold storage at these temperatures the pears may be preserved for one-and-a-half to 3 months. At 150 mm Hg. the storage was improved, but at 60 mm Hg. the pears kept for 4 to 6 months in satisfactory condition. Upon subsequent removal from storage, the pears ripened properly with no internal browning and had a normal shelf-life. In a companion experiment using Clapp pears, a pressure of 40 mm Hg. proved to be superior to 60 mm Hg. in prolonging storage life. In another like experiment, Bartlett pears were stored at 6°C and separately at 40 mm Hg. and at 60 mm Hg. Under these conditions they responded to hypobaric storage as before but at each pressure their storage life was shorter than at minus 1° to plus 1°C.

EXAMPLE 3

Cut roses, carnations, gladiolas, snapdragons, chrysanthemum and aster blossoms were stored at pressures ranging from 40 to 150 mm Hg. and at 0° to 3°C. Under normal cold storage conditions in the dry state, the flowers faded within 1 to 2 weeks even when wrapped with perforated polyethylene film. Under hypobaric conditions, relatively small but significant benefit was realized at pressures of 100 to 150 mm Hg., but at 40 to 80 mm Hg. even without plastic wrap, the flowers were preserved in excellent condition for 4 to 9 weeks and still retained nearly their initial vase-life. The blooms respond to commercial flower preservatives. Storage life of flowers under hypobaric conditions is further improved by using plastic wraps. Snapdragons and gladiolas can not be stored in a horizontal position at atmospheric pressure and 0° to 3°C for within a few days they develop geotropic curvatures. At the same temperature but under hypobaric conditions they can be stored horizontally for several weeks without curving.

EXAMPLE 4

Potted chrysanthemum plants, vars. Neptune, Golden Anne, Delaware and Bright Golden Anne, were stored at pressures ranging from 40 to 150 mm Hg. and at 0° to 4°C. The plants were selected to have flower buds at various stages of opening. Under normal cold storage conditions, the shelf-life of the blooms after the plants are removed from storage, begins to decline if the plants have been stored for more than 1 week. Under hypobaric conditions relatively small but significant benefit was realized at pressures ranging from 100 to 150 mm Hg., but at 40 to 80 mm Hg. the plants were kept for 4 weeks without any diminution in the subsequent shelf-life of the blooms. Even tightly closed flower buds subsequently opened, whereas they aborted on plants removed from normal cold storage after about one week. Potted Easter lillies having flower buds just cracked open were stored at 2°C and pressures ranging from 40 to 60 mm Hg., and remained in good condition for 6 weeks, whereas in cold storage the leaves became chlorotic in 2 weeks. After hypobaric storage the flowers had a normal shelf-life.

EXAMPLE 5

Non-rooted cuttings of chrysanthemums, consisting of nearly 100 varieties, were stored at 40 to 150 mm Hg. and at 0°C to 4°C. Under normal cold storage conditions such cuttings lose their viability within 10 days to 6 weeks, depending upon the variety, even when they are wrapped in perforated polyethylene sheets. Under hypobaric conditions, storage was improved at 100 to 150 mm Hg., but at 40 to 80 mm Hg., the cuttings remained viable for more than 6 to 12 weeks without plastic wrap. Similar results were obtained with rooted cuttings, except that under normal cold storage conditions, they develop apical and leaf yellowing within about 1 week, whereas this does not occur for about 12 weeks at 40 to 60 mm Hg. Cuttings of geraniums were stored at 2° to 7°C and pressures of 40 to 200 mm Hg. The optimal condition for storage was 2°C at a pressure of 40 mm Hg. Under these conditions the cuttings were preserved for 3 to 4 weeks and subsequently rooted without leaf yellowing and abscission. At 2°C in cold storage the cuttings deteriorate within 2 to 7 days and when rooted lost their leaves and yellowed. Improved results are obtained with all cuttings if they are protected by polyethylene wraps.

EXAMPLE 6

At 11°C under normal cold storage conditions, cut floral spikes of Red Ginger wrapped in polyethylene, become unsaleable within 5 to 7 days mainly because of deterioration of the leaves. Soon thereafter the flower also browns and desiccates. Under hypobaric conditions, a significant benefit is obtained at a pressure higher than 100 mm Hg. at similar temperature even without plastic wrap. However, at 50 to 60 mm Hg. both the leaves and bloom are preserved for 4 to 5 weeks. Subsequently, upon removal from storage, the floral spikes displayed a nearly normal shelf-life.

EXAMPLE 7

The cut bloom of Heliconia latispathea developed necrotic spots and faded within about 10 days when stored at 10°C under normal cold storage conditions. Hypobaric storage in the pressure range between 100 and 150 mm Hg. prolongs storage life at this temperature, but at lower pressures, such as 60 mm Hg., the bloom is preserved for as long as 40 days.

EXAMPLE 8

Vanda joacquim blooms stored at 10°C under normal cold storage conditions faded and dehisced in about 2 weeks. Under hypobaric conditions in the pressure range between 100 and 150 mm Hg., and at the same temperature, the orchid blossoms had enhanced storage life. However, the effect was not nearly as marked as that at lower pressures, such as 40 mm Hg. at the same temperature. Under these conditions, the blooms were preserved for more than 40 days and subsequently displayed nearly normal vase-life.

EXAMPLE 9

Choquette avocados ripen in 8 to 9 days when stored under normal cold storage conditions at 12°C. Hypobaric pressures ranging from 100 to 150 mm Hg. at 12°C significantly extend storage life, but lower pressures in the range between 40 and 80 mm Hg. are even more efficacious, allowing the fruit to be stored for about 25 to 26 days. Similar results were obtained at 15°C except all fruit ripened more rapidly than at 12°C. At 10°C chilling damage soon became apparent, but those fruits under hypobaric conditions were the last to develop this disorder.

EXAMPLE 10

At 10°C under normal cold storage conditions Waldin avocados ripened in 12 to 16 days. Hypobaric pressures ranging from 100 to 150 mm Hg. at 10°C extended the storage life but were not nearly as effective and desirable as pressures ranging from 60 to 80 mm Hg. at the same temperature, which allowed the fruit to be stored for about 30 days. At 12°C all fruits ripened more rapidly than at 10°C but those under hypobaric conditions were still preserved for the longest time. At 8°C the Waldin avocados experienced chilling damage, albeit those under hypobaric conditions were the last to develop this disorder.

EXAMPLE 11

At 8°C under normal cold storage conditions, Lula avocados ripened in 23 to 30 days, whereas under hypobaric conditions in the pressure range between 40 to 80 mm Hg. and at the same temperature, they were preserved for 75 to 100 days. Higher pressures, in the range between 100 and 150 mm Hg. at 8°C are not as desirable or effective in preventing ripening of Lula fruit. Chilling damage occurred when the temperature was lowered to 6°C, but fruits kept under hypobaric conditions were the last to develop this disorder. Booth 8 avocados stored at 8°C under normal cold storage conditions ripened in about 8 to 12 days, whereas hypobaric pressures in the range between 40 and 80 mm Hg. at the same temperature preserved them for about 45 days. Between 10°C and 15°C ripening occurred progressively more rapidly but fruits stored under hypobaric conditions were still preserved for a much longer time than those kept under atmospheric conditions. Chilling damage developed at 6°C, but only very slowly in fruits stored at a low pressure. In general the storage of avocados is further improved and desiccation prevented if the fruits are kept in plastic bags with small perforations.

EXAMPLE 12

Fresh green onions are difficult to store using only standard refrigeration. At 0° to 3°C they remain in a saleable condition for only 2 to 3 days. Under hypobaric conditions small but significant advantage is gained at pressures ranging from 100 to 150 mm Hg. at 0° to 3°C, but at 60 to 80 mm Hg the scallions remain in a saleable state for more than 3 weeks.

EXAMPLE 13

The storage of green peppers, cucumbers, pole-beans and snap-beans was better at 8° to 13°C under hypobaric conditions in the pressure range between 100 and 150 mm Hg. than it was under normal cold storage at those temperatures. However, at pressures ranging from 60 to 80 mm Hg. and at the same temperatures, better results were obtained. For example, at 8° to 13°C under cold storage, green peppers were preserved for 16 to 18 days, whereas at 80 mm Hg. and 8° to 13°C. they remained fresh for 46 days. At 8°C the peppers suffered cold damage both in cold storage and at 80 mm Hg. but at 80 mm Hg. the damage did not become apparent until several days after they were transferred from the 80 mm Hg. to air. At 5° to 8°C snap-beans spoil in 7 to 10 days using conventional cold storage, but are preserved for about 26 days at 60 mm Hg. at the same temperatures. In cold storage at 10°C, cucumbers can be kept for 10 to 14 days, whereas at 80 mm Hg. and 10°C they are preserved for 49 days. Pole-beans can be preserved for 10 to 13 days at 8°C in cold storage, but remain in good condition for 30 days at 60 mm Hg. and 8°C.

EXAMPLE 14

Ripe strawberries, vars. Tioga and Florida 90, normally spoil within 5 to 7 days if stored at 0° to 2°C by conventional cold storage means, whereas they are preserved for about 4 to 5 weeks at 0° to 2°C at pressures ranging from 80 to 200 mm Hg. Blueberries were kept up to 4 weeks in a saleable condition under normal cold storage at 0° to 1°C, but remained in good condition for at least 6 weeks at that temperature and pressures ranging from 80 to 200 mm Hg.

EXAMPLE 15

Iceburg lettuce remains saleable for about 2 weeks under cold storage conditions at 0° to 4°C, but remained fresh for about 4 weeks at those temperatures in the pressure range between 80 to 200 mm Hg. Not only did the leaves stay crisper under hypobaric conditions, but also the butts remained whiter. Pressures in the range between 150 to 200 mm Hg. are preferred, because my present observation is that lower pressures can induce a disorder known as "pink-rib".

EXAMPLE 16

Ruby red grapefruit developed peel pitting and lost its flavor within 4 to 6 weeks when stored at 6°C by means of cold storage. Flavor was retained but the peel still pitted during 90 days' storage at the same temperature, using hypobaric pressures in the range between 80–150 mm Hg. However at 250–400 mm Hg. peel pitting was prevented and flavor retention improved during 90 days' storage.

EXAMPLE 17

Mature green tomatoes were stored at temperatures of 7°, 10°, 13°, and 16°C and pressures of 60, 80, 100, and 125 mm Hg. The optimal condition for storage was 13°C at a pressure of 80 mm Hg. Lower temperatures caused chilling damage and higher temperatures hastened ripening during storage and increased the incidence of decay. Lower pressures caused internal tissue damage and induced decay, whereas higher pressures hastened ripening significantly. The fruit was held for 8 weeks in a green state at 13°C and about 80 mm Hg. under my method and subsequently ripened normally at room temperature and atmospheric pressure under normal shelf conditions. The same fruit kept at 13°C in cold storage ripened within 2 weeks. It was found that washing the fruit in chlorinated water lowered the incidence of decay during my hypobaric storage and subsequent ripening.

EXAMPLE 18

Freshly slaughtered ribs and rounds of beef were stored at 2°C and pressures ranging from 10 to 75 mm Hg. In each treatment samples were either stored naked or wrapped with a thin polyethylene, polyvinylchloride (PVC), or polyvinylidene chloride film. Meat stored in cold storage in the plastic wraps developed slime, off-odor, a deep black-red color, and discolored fat within 2 to 3 weeks. Weight loss was about 1%. Meat stored naked or wrapped at pressures ranging from 30 to 75 mm Hg. did not store as well as wrapped meat in cold storage, and the lower the pressure the more rapidly the meat browned. However, meat that was wrapped with a plastic wrap and stored at 10 and 15 mm Hg. was well preserved for 45 days. At these pressures and at 2°C, the meat retained its red bloom, failed to develop slime and off-odor, and maintained white fat. Without the plastic wrap, severe desiccation occurred at all pressures tested with weight loss increasing progressively from 2% at 75 mm Hg. to 6% at 10 mm Hg. When the meat was wrapped in plastic it lost only 1% of its weight regardless of the pressure. Even better results were obtained when the meat was stored at minus 1°C and 8 mm Hg., but at minus 2°C there was some loss of bloom and evidence of freezer burn. I presently believe that lamb and veal will store with my method in the same manner and with the same advantages of beef.

EXAMPLE 19

Pork loins and butts were stored at minus 1°C at pressures of 8 to 15 mm Hg. The pork was wrapped in PVC film. After 3 weeks, the pork was still in excellent condition. It had no odor, retained its initial color, showed no signs of slime formation or desiccation, and had a very low percent shrink. Under cold storage conditions, the pork spoiled in about 7 days.

EXAMPLE 20

Fryer chickens, under normal cold storage conditions at minus 1° to 2°C develop an unpleasant odor, experienced extensive shrinkage, and became covered with plaques of Pseudomonad bacteria within 3 to 7 days. Chickens stored at 50 to 150 mm Hg. benefitted from the treatment, but at 10 to 25 mm Hg. during a three-week period, odor, shrinkage and Pseudomonas development were almost completely prevented. Use of a water retentive wrap was beneficial, especially at the lower pressures.

EXAMPLE 21

Freshly harvested shrimp were wrapped in PVC film and stored at minus 1° to plus 2°C using pressures ranging from 8 to 125 mm Hg. Under cold storage conditions, the shrimp became blotchy and developed a sever bilgy and fishy odor within 4 to 6 days, whereas under hypobaraic conditions, it was well preserved for more than 15 days. The optimal pressure for storage was 8 to 25 mm Hg. although even 125 mm Hg. caused substantial benefit. At 8 mm Hg. pressure and the above temperatures, the shrimp did not become blotchy and had no bilgy or fishy odor after 15 days.

EXAMPLE 22

Freshly caught mangrove snappers and grunts were stored at minus 1° to plus 2°C at pressures ranging from 8 to 150 mm Hg. The mangrove snappers were gutted before storage whereas the grunts were stored intact. In each case, the fish were stored either naked, or wrapped in plastic. In cold storage the fish softened and developed slime and a foul odor within 4 to 6 days, whereas under hypobaric conditions it was preserved for 2 to 3 weeks. The optimal storage pressure was 8 to 25 mm Hg. Plastic wrap (polyethylene or PVC) was required.

EXAMPLE 23

Unrooted cuttings of chrysanthemum, var. Blue Marble, were stored at 2°C, 60 mm Hg. presssure and loosely wrapped with polyethylene. Each day the pressure was cycled by being raised to atmospheric pressure for periods of 0, 2, 4, 6, 8, 10, 12, or 14 hours, and then returned to 60 mm Hg. During the period when the pressure was raised the air flow was continued and humidity kept high at a temperature of 2°C. In cold storage after 10 days the cuttings became chlorotic and did not root properly. After 6 weeks storage, cuttings cycled for 14 hours each day showed slight leaf yellowing, but those cycled for 2 to 8 hours each day appeared to remain greener than cuttings kept under continuous hypobaric pressure. Similar results were obtained when cuttings were cycled to cold storage conditions without humidification and air through-flow.

EXAMPLE 24

Unrooted cuttings of geranium were stored at 40 mm Hg., 2°C and loosely wrapped with polyethylene. The vacuum was interrupted for 8 hours each day. Under these conditions, the cycled cuttings were as well preserved during a 3 week period as those kept continuously at 40 mm Hg., and both types rooted properly without leaf yellowing. Cuttings kept in cold storage at a temperature of 2°C yellowed after 2 to 7 days' storage and lost their leaves when an attempt was made to root them.

EXAMPLE 25

Cut carnations were stored at 1°C, at pressures ranging from 25 to 40 mm Hg., loosely wrapped with polyethylene. Some of the blooms at 40 mm Hg. were cycled to atmospheric pressure for 4 hours each day. After 4 weeks, the blooms were removed and vase-life determined. A large percentage of blooms stored in cold storage at atmospheric pressure and wrapped with polyethylene failed to open properly, and those that did, had a relatively short vase-life. The vase-life of blooms kept continuously at 25 or 30 mm Hg. was slightly better than that of blooms kept at 40 mm Hg. Cycling the blooms to atmospheric pressure for 4 hours each day at 40 mm Hg. diminished the incidence of tip burn.

EXAMPLE 26

Mature green tomatoes were stored at a pressure of 80 mm Hg. and temperatures of 13°C. Control fruit held in cold storage ripened in about 2 weeks. The vacuum in my method was interrupted daily for either 0, 2, 4, 6, or 8 hours. Interrupting the vacuum for 8 hours had little effect on the storage life of the fruit during an 8 week period, but a 2, 4, or 6 hour cycle slowed the rate of ripening and reduced the incidence of decay. Best results were obtained with a 4 hour cycle.

EXAMPLE 27

Potted azalea plants having dormant flower buds were stored at 4°C and 40 mm Hg. The hypobaric pressure was interrupted for 8 hours each day. After 6 weeks, the plants retained their initial green color in spite of the fact that they were continuously in darkness. When placed in the light under atmospheric conditions, they flowered in an additional 6 weeks. Plants stored at 4°C under cold storage conditions developed severe chlorosis even though they were watered as required and irradiated with artificial light.

EXAMPLE 28

Fore and hind quarters of beef were wrapped in PVC film for storage in a hypobaric trailer at a pressure of 8 to 10 mm Hg. The interior wall surfaces and mechanism of the trailer were precooled to a temperature of minus 1°C and thereafter kept at that temperature. The beef initially had a temperature of 10°C at the time of loading it into the trailer. The temperature of the beef was dropped to minus 1°C within 18 hours, and weight loss measured 3 weeks later was only 2%, indicating that the initial temperature reduction occurred without evaporative cooling of the beef. The condition of the beef was excellent even after 45–50 days of storage. When a similar experiment was run at 16 to 18 mm Hg., cool-down to minus 1°C required nearly 48 hours.

Some of the foregoing data as well as additional storage data are presented by the following Tables A through F to illustrate the superiority of preserving MAM by my invention as compared with the prior art including my prior U.S. Pat. No. 3,333,967 and conventional, so-called normal cold storage at atmospheric pressure. In the tables, data obtained by my improved method is called "LPS". Where data, such as temperature or pressure is stated in a single FIGURE, it should be taken as a preferred value or an optimum mean.

TABLE A

| | NON-RIPE FULLY MATURE FRUIT | | | |
|---|---|---|---|---|
| | Temp. | Storage Life — Days | | LPS Pressure |
| Variety | (°C) | Cold Storage | LPS Storage | mm Hg. |
| Tomato (mature green) | 13 | 10–14 | 56* | 80 |
| Avocado, Choquette | 13 | 8–9 | 25–26 | 40–80 |
| Avocado, Waldin | 10 | 12–16 | 22–30 | 60–80 |
| Avocado, Lula | 7 | 23–30 | 75–100 | 40–60 |
| Avocado, Booth 8 | 7 | 8–12 | 45–60 | 40–80 |
| Lime, Tahiti | 7 to 10 | 14–35 | 60–90 | 80–150 |
| Pineapple | 7 to 10 | 10–14 | 28–30* | 80–150 |
| Apple, McIntosh | −1 to 0.6** | 60–120 | 180–200 | 60 |
| Apple, Red Delicious | −1 to 0.6 | 60–120 | 240–270 | 60 |
| Apple, Golden Delicious | −1 to 0.6 | 90–120 | 240–270 | 60 |
| Apple, Jonathan | −1 to 0.6 | 60–90 | 240–270 | 60 |
| Pear, Bartlett | −1 to 0.6 | 75–90 | 150–180 | 50 |
| Pear, Clapp | −1 to 0.6 | 45–60 | 120–150 | 50 |
| Peach, Cardinal | 0 to 1 | 14–21 | 28–35 | 80 |
| Nectarine | 0 to 1 | 11–20 | 28–35 | 80–120 |

*Storage life is limited in these instances by mold development at the indicated times.
**Throughout this specification figures for temperatures given without plus or minus designations are intended to be read as above 0°C.

Table B

| | RIPE, FULLY MATURE FRUITS | | | |
|---|---|---|---|---|
| | Temp. | Storage Life — Days | | LPS Pressure |
| Variety | (°C) | Cold Storage | LPS Storage | mm. Hg. |
| Orange, Valencia | 4 | 72 | 157 | 70–110 |
| Grapefruit, Ruby Red | 5 to 6 | 30–40 | 90–120* | 250–400 |
| Strawberry, Fla. 90 and Tioga | 0 to 2 | 5–7 | 28–35* | 80–200 |
| Cherry, Sweet | 0 to 2 | 14 | 28 | 80–200 |
| Tomato (vine-ripe) | 0 to 2 | 8–10 | 30–45 | 100 |
| Blueberry | 0.5 | 28 | 42* | 80–200 |

*Storage life is limited in these instances by mold development at the indicated times.

Table C

| | VEGETABLES | | | |
|---|---|---|---|---|
| | Temp. | Storage Life — Days | | LPS Pressure |
| Variety | (°C) | Cold Storage | LPS Storage | mm Hg. |
| Green pepper | 8 to 13 | 16–18 | 46* | 80 |
| Cucumber | 10 | 10–14 | 49* | 80 |
| Bean, Pole | 7 | 10–13 | 30* | 60 |
| Bean, snap | 5 to 8 | 7–10 | 26* | 60 |
| Onion, green | 0 to 2 | 2–3 | 15 | 50 |
| Lettuce, iceburg | 0 to 2 | 14 | 28 | 80–200 |

*Storage life is limited in these instances by mold development at the indicated times.

Table D

| | FLOWERS — CUT | | | |
|---|---|---|---|---|
| | Temp. | Storage Life — Days | | LPS Pressure |
| Variety | (°C) | Cold Storage | LPS Storage | mm Hg. |
| Red ginger | 11 | 5–7 | 28–35 | 50 |
| Snapdragon | 2 | 14 | 42 | 40 |
| Heliconia latis-pathea | 12 | 10 | 41* | 60 |
| Vanda joacquim | 12 | 16 | 41 | 40 |
| Carnation | 0 to 2 | 10 | 91–98* | 25–60 |
| Rose | 0 | 7–14 | 36 | 40 |
| Chrysanthemum | 0 to 2 | 6–8 | 21–28 | 70 |
| Gladiolus | 2 | 7 | 28 | 40–60 |

*Storage life is limited in these instances by mold development at the indicated times.

Table E

| | VEGETATIVE MATERIALS AND FLORAL CROPS | | | |
|---|---|---|---|---|
| | Temp. | Storage Life — Days | | LPS Pressure |
| Variety | (°C) | Cold Storage | LPS Storage | mm Hg. |
| Potted chrysanthemums | 0 to 2 | 7 | 28 | 60–80 |
| Potted Easter lillies | 2 | 14 | 42 | 40–60 |
| Chrysanthemum cuttings | | | | |

Table E-continued

| Variety | VEGETATIVE MATERIALS AND FLORAL CROPS Temp. (°C) | Storage Life — Days Cold Storage | LPS Storage | LPS Pressure mm Hg. |
|---|---|---|---|---|
| (non-rooted) | 0 to 2 | 10–42 | 42–84 | 40–80 |
| Chrysanthemum cuttings (rooted) | 0 to 2 | 7 | 42–84 | 40–80 |
| Carnation cuttings (non-rooted) | 0 to 2 | 90 | 270 | 40–60 |
| Geranium cuttings (non-rooted) | 0 to 2 | 2–7 | 21–28 | 40 |
| Potted Azaleas | 4 | 14–28 | 42 | 40 |

Table F

| Variety | ANIMAL PRODUCTS Temp. (°C) | Storage Life — Days Cold Storage | LPS Storage | LPS Pressure mm Hg. |
|---|---|---|---|---|
| Beef | −1 to 2 | 14 | 50 | 8–15 |
| Chicken | −1 to 2 | 7 | 21 | 8–50 |
| Pork | −1 to 2 | 7 | 28 | 8–15 |
| Shrimp | −1 to 2 | 4–6 | 15–20 | 8–50 |
| Fish | −1 to 2 | 4–6 | 15–20 | 8–15 |

While 100% relative humidity in the air that is caused to flow about the MAM is often best, at least in theory, it has been determined that relative humidities as low as about 80% are usefully permissible. Preferably, the humidity should be higher than about 90%. Even relative humidities of about 80% are often difficult to maintain continuously and uniformly under hypobaric conditions in a large, commercial size chamber. When the incoming air is cold it picks up relatively less water vapor in passing through a humidifier having a set water temperature, whereas when the incoming air is warm it picks up more water vapor and may even drop condensate water on the produce and floor of the vacuum chamber upon cooling to the temperature of the chamber. Therefore some means of stabilizing the temperature of the incoming air is highly desirable in order to avoid humidity fluctuations and commodity damage within the storage chamber. A problem also arises in connection with the fact that not all of the incoming air necessarily enters through the humidifier. In some instances, as when incoming air is used to drive pneumatically actuated equipment in the chamber, it may by-pass the humidifier initially and intentionally. In other instances, for example in a large commercial structure such as a concrete warehouse, a certain amount of in-leakage of air through the surfaces and seams is unavoidable, and this air upon expanding within the structure will have an extremely low content of water vapor. vapor tends to For these reasons it is highly desirable to provide means for recirculating air within the vacuum chamber, so that all or some part of the air repeatedly passes through the humidifier and therefore, regardless of its route of entry into the chamber, it will become saturated, or sufficiently saturated, with water vaopr at the temperature within the chamber. Recirculating the air through the humidifier has the additional advantage that it tendsto compensate for inefficiency in the humidification system. Generally I have found that even when wicks, atomizers or other devices are used to increase the efficiency of the humidification process it is difficult, if not impracticable, to saturate the incoming air in a single pass through a humidifier of economically modest capacity without increasing the water temperature to a high value.

A further factor influencing the attainment of a constant, high relative humidity in a vacuum storage chamber is the aforementioned evaporative refrigeration effect. In a relatively small apparatus the high surface to volume ratio of the water bath favors sufficient heat exchange between the water and surrounding atmosphere to cause the water temperature to approach that within the storage chamber in which the water bath is situated. Normally, not less than about ¼ chamber volumes of rarified air should be passed through the hypobaric chamber each hour to flush away undesirable vapors, and gases, such as ethylene, carbor dioxide and off-odors produced by the stored MAM or microorganisms growing thereupon. Such a rate of through-flow of air will, normally, also supply sufficient oxygen to replace that consumed by respiration. This through-flow or through-put of air does not substantially lower the water temperature if the chamber volume to water volume is small, for example from about 20:1 to about 200:1, because of the low rate of cooling and rapid heat exchange between the water vessel and surrounding atmosphere. However, in a large apparatus where the ratio of the chamber volume to water volume may be in the order of 1000 or more to 1, the cooling effect is relatively much greater and the heat exchange between the water reservoir and surrounding atmosphere less rapid because of an unfavorable surface to volume ratio in the larger water reservoir. Under these and other adverse conditions, evaporative cooling tends to reduce the water temperature so that a humidity of even 80% cannot be sustained in the vacuum storage chamber without doing more than merely passing the input air through a body of water once.

The present invention continually attains a desired relative humidity preferably by preconditioning the incoming air to have a temperature close to that in the storage chamber and maintaining the temperature of the water in the humidifier at least equal to or higher than that of the air in the storage chamber. It is also preferable to prolong or multiply the contact time between the circulating air and the water, for example by recirculating the air through the humidifier or by utilizing spray atomizers. I prefer that heat be supplied to the water to maintain its temperature at or above that of the temperature in the storage chamber, for example, from about 2° to about 20°C higher. The heat energy may be obtained from different sources or a combination of sources.

For example, heat may be garnered from the interior of the chamber by various means such as circulating heat exchange fluid in tubes which are in intimate contact with an internal surface, preferably metal, of the chamber and/or recirculating the gas within the chamber and contacting it with a heat exchange surface to transfer the heat of the gas to the water in the humidifier of my et al. U.S. Pat. No. 3,810,508. While this latter method of heating the water is useful and serves the dual function of keeping the chamber cool, by itself it never quite raises the temperature of the water to closer than a few degrees lower than that of the chamber air. Under these conditions, supplementary heat must be added. This can be done in a second stage of humidification by subsequently contacting the air with a second water source maintained 2° to 20°C hotter than the chamber air temperature. The air preferably passes through the second humidification stage without experiencing a pressure drop; otherwise a back pressure is created in the first stage humidifier and its efficacy is greatly diminished. A convenient solution to this problem is to spray humidify with warm water in the second stage.

Alternatively as indicated in the accompanying drawing, the additional heat may be supplied all in a single stage by spray humidifying and heating the water in the conduit leading from the water reservoir to the spray nozzle. When use is not made of the refrigeration effect and/or when heat rather than refrigeration is required to maintain the desired chamber temperature, heat may be added directly to the water in the reservoir as by heating the water with an electric immersion heater.

Loss of water from the stored matter tends to occur, especially during a prolonged storage period, particularly at pressures below 100 mm Hg even when the relative humidity of the gas in the chamber is at or close to 100%. The rate of escape of water from the commodity is roughly proportional to the rate of movement of air over the commodity, and therefore under these conditions I prefer that air circulation or recirculation be kept at or near the minimum required to maintain temperature and humidity uniformity in the storage chamber, while supplying adequate oxygen and flushing away released gases. Water loss of this nature can be slowed or prevented by wrapping the stored matter in water-retention means such as in sheets of synthetic, resinous plastic or a perforated bag of the same material. Synthetic, resinous plastics which can be used include polyethylene, polypropylene, polyvinyl chloride, polyvinylidine chloride (Saran wrap), polyvinyl butyral, polymethacrylate esters, and the like as well as copolymers thereof. Polyethylene is preferred because it tends to restrict the movement of water while allowing the passage of gases such as oxygen, ethylene and carbon dioxide. Such plastics do not interfere with the operation of the hypobaric process but to the contrary tend to prolong storage life of certain commodities. For some commodities, beef for example, at pressures below 100 mm Hg. wrapping or the equivalent presently appears to be essential. With avocados and bananas, ripening is actually slowed by plastic wraps when the commodity is placed in a vacuum chamber maintained in accordance with the present invention.

A unique characteristic of my nw hypobaric system is that, because the rarified air is maintained at or near its dew point, the water vapor pressure is kept at a constant value regardless of pressure. The amount of water vapor present in the rarified air is a function of temperature, not pressure; whereas the amount of air present is directly related to pressure with the reservation that at pressures below about 100 mm Hg. a significant correction for the amount of water vapor present must be made.

The stored commodities can be cooled down most rapidly in the hypobaric environment by progressively reducing the hypobaric pressure as the temperature of the commodity is reduced so that the pressure always is only slightly higher than the vapor pressure of the water in the commodity. At pressures close to the water vapor pressure in the commodity the thermal conductivity of the hypobaric atmosphere approaches that of pure water vapor, which is thirty times greater than that of air assuming no substantial Dewar effect occurs. The commodity should not be exposed to pressures below its permissible minimal level for such a period of time as will cause internal damage by oxygen deficiency or other deleterious actions by low pressure. Rapid cool-down can be accomplished by monitoring the pulp temperature of the commodity with a temperature probe inserted therein and adjusting the pressure regulator valve to a pressure that is slightly higher than the vapor pressure of water at the pulp temperature.

Alternatively, for many commodities the cool-down process can be carried out at the optimal hypobaric storage pressure for the particular commodity. Various combinations of progressively decreasing pressure and fixed pressure cool-down can also be used. The use of a plastic water retentive wrap improves the cool-down process by maintaining the air between the wrap and the commodity near its dew point, thus providing high thermal conductivity thermal regardless of the conductivity of the humid hypobaric air outside the wrap. During cool-down the temperature of the recirculating air always is intermediate between that of the cooling surface and that of the hot commodity, so the water vapor content of the recirculating air is much lower, and the absolute amount of oxygen and nitrogen somewhat higher than that in the warm atmosphere between the commodity and plastic wrap.

If the hypobaric pressure is close to the vapor pressure of water in the commodity, the gas between the commodity and the wrap is composed almost entirely of water vapor, whereas the recirculating air has a relatively low water content and thermal conductivity. Under these conditions heat will flow from the commodity very rapidly. Since the speed of cool-down is limited by the rate at which heat leaves the commodity, provided the heat can be transferred efficiently to a cooling surface, the maintenance of a high humidity in close proximity to the commodity facilitates an extraordinarily rapid cool-down under hypobaric conditions. This cannot be accomplished at atmospheric pressure because water vapor does not substantially increase the thermal conductivity of air when the pressure is greater than 100 mm Hg.

As the pressure is reduced below 100 mm Hg. the proportion of water vapor molecules relative to oxygen and nitrogen molecules increases almost logarithimically until at a pressure equal to the vapor pressure of water at the operational temperature, all the molecules are water vapor. The thermal conductivity of a gas is independent of pressure until the Dewar effect sets in at some low pressure, usually between 0 and 25 mm Hg., the exact value being a function of the distance between the cooling surface and the body being cooled. The thermal conductivity of gas mixtures such as water and air cannot be calculated additively from the corresponding values for the pure components since it depends upon the mean free path, and this magnitude for one species of molecules is influenced by the presence of another species. It can be calculated from the Enskog equation for viscosity of gas mixtures since thermal conductivity is directly related to viscosity.

The thermal conductivity of a dry gas mixture is substantially independent of temperature at any pressure. Thermal conductivity of an air-water mixture is relatively constant from 760 mm Hg. to about 100 mm Hg., below which its thermal conductivity rises in a nearly logarithmic manner because of the fact that water vapor conducts heat about 30 times faster than nitrogen or oxygen molecules. Thermal conductivity of water saturated air is markedly dependent on temperature at pressures below 100 mm Hg., because temperature than influences the percent of water in the mixture. Consequently when the absolute pressure equals the vapor pressure of water, the thermal conductivity of water saturated air is 30 times greater than dry air at any pressure, or water saturated air at pressures greater than 100 mm Hg.

Experimentally I have determined that in a commercially sized hypobaric trailer the Dewar effect does not set in at 8 mm Hg. absolute pressure. If the Dewar effect became pronounced, the thermal conductivity would decline to a very low value. As the pressure of dry air is reduced, the heat capacity declines proportionately, and accordingly at pressures lower than 100 mm Hg. it becomes impossible to refrigerate the atmosphere by conduction without resort to an impractical rate of air recirculation or an excessively large cooling surface area. The heat capacity of water vapor (0.5 cal/gm/°C) is about twice that of air (0.24 cal/gm°C) so water-saturating the air only slightly alleviates the problem of reduced heat capacity at low hypobaric pressures. However, the most important factor making conductive heat exchange possible at low hypobaric pressures is the increased thermal conductivity below 100 mm Hg. caused by water vapor, for the rate of heat transfer is proportional approximately to thermal conductivity times heat capacity. I have discovered that it is this remarkable physical property of water-saturated air at low pressures which enables me to use my hypobaric process at pressures lower than 100 mm Hg. As mentioned above the cool-down of hanging quarters of PVC wrapped beef from 10° to minus 1°C took only 18 hours in the pressure range of 8 to 10 mm Hg. Whereas it took 48 hours in the pressure range of 16 to 18 mm. Hg.

During and after cool-down the transfer of heat to the refrigeration means can be improved by recirculating air within the hypobaric chamber, but often the through-put of air provides sufficient circulation by itself. The requirement for recirculation varies with the pressure and storage temperature, and is preferably determined empirically. A cooling advantage also is gained by increasing the surface area of the coiled fins or plates of the refrigeration surface. In the case of a trailer or cargo container, this can be accomplished by making the entire inner wall a cooling surface, using heat exchange fluid such as glycol or brine to cool it by passage through conduits embedded in or in close contact with the walls. It is important that the temperature of the refrigerant entering and leaving the storage compartment be as nearly equal as possible. If there is a large difference between the in-and-out temperature the humidity in the chamber will be reduced because water will condense on the colder incoming refrigerant line. The dew-point in the chamber can be no higher than the temperature of the incoming refrigerant. When using cooling tubes carrying liquid refrigerant, in contact with the metal walls of a hypobaric container, I have found it advantageous always to pair the tubes so that one member carries incoming coolant, and the other coolant which is leaving. In this manner a more uniform temperature is maintained in the vicinity of the coolant lines, and the humidity kept at the highest desirable value.

In the accompanying drawings, FIG. 1 illustrates presently preferred apparatus for carrying out my hypobaric storage methods and improvements. An insulated vacuum chamber 10 is provided which is capable of withstanding external pressure safely in excess of any possible maximum atmospheric pressure. A humidifier tank 11 containing water 12 is preferably or conveniently situated within vacuum chamber 10. Air is continuously, or intermittently evacuated from the chamber by a conventional vacuum pump P at a rate influenced in part, if desired, by the degree of closure of valve 14 in line 15. The rate of flow of air through the chamber and the pressure in the chamber may be adjusted primarily by valves 14 and 30 and regulator 32 to provide between about 0.25 to 10 changes of chamber air per hour. Atmospheric air enters the system through conduit 16, on the right as viewed, passing through an air filter 17. The filter may contain charcoal, inert pellets coated with permanganate salt (marketed under the trademark "Purafil"), molecular sieves or other purifying agents alone or in combination to remove atmospheric contaminants such as carbon monoxide and ethylene.

These gases and various other unsaturated atmospheric contaminants influence biological processes in such a way that they cause fruit ripening, scald, senescence, aging, abscission or twisting of leaves, stems and floral parts, fading of flowers, chlorosis of leaves, and certain physiological disorders such as sepal wilt in orchids, "sleep" of carnations, and browning of lettuce. Fortunately, when atmospheric air enters the vacuum chamber it expands so that the partial pressure of any contaminant is reduced proportionately. Under hypobaric conditions, if the pressure in the vacuum chamber is sufficiently low, the concentrations of contaminants tend to be reduced to values lower than those needed to influence biological processes adversely except under conditions of severe atmospheric pollution. In that event, filter 17 will be called upon for extra duty or increased capacity. The rate of flow of incoming air at atmospheric pressure is preferably indicated by a rotameter 18 or other flow meter.

Preferably the incoming air is preconditioned to or toward the temperature within the vacuum chamber 10, by passing it through a heat exchanger 20 where it exchanges heat with the "used" air leaving the vacuum chamber. Preconditioning in heat exchanger 20 may lower the temperature of the incoming air if it be warmer, without increasing the overall refrigeration requirement for the chamber. To further precondition the input air, it is passed through section 21 of conduit 16 which may be longer than, or comprise a plurality of, the single length as shown, and has intimate contact with the inner wall suface of the chamber 10.

The input air flows through parts 22, 23, 38 and 39 extending from conduit 16 to enter the chamber 10. All parts of the conduit 16 downstream of heat exchanger 20 which lie outside of the chamber should be insulated as suggested at 19. Branch conduit 22 leads to the side inlet of the annular high pressure injector jet of a conventional venturi-type air-mover 24. A relatively small volume of air at atmospheric pressure flows through branch part 22 and through the injector of the air-mover at high velocity because it drops in pressure from atmospheric to the low pressure obtaining within the vacuum chamber and within humidifier 11. This induces a large flow of air through the low pressure body of the air-mover 24. Air is thus drawn into inlet elbow 28 from within the chamber 10 and into humidifier 11 above the water level of reservoir 12 whence it flows upwardly through water spray from nozzle 35 and out from the humidifier at outlet 25. The humid air is recirculated in this way throughout the chamber 10 as indicated by arrows 27. A fraction of the moving air is withdrawn from the chamber 10 by vacuum pump P through conduit 15, and the remainder is preferably drawn to the air-mover via elbow 28 for continued recirculation. The recirculating air preferably passes over or through a heat exchange coil C of a conventional refrigeration and heating system not shown, which provides heating and cooling, as need be, responsive to a conventional temperature sensing device, not shown, located within chamber 10. Air can also be moved by conventional fans or blowers disposed in the chamber.

The rate of recirculation of chamber atmosphere is controlled by valve 30 in branch conduit 22, and can be judged from reading vacuum gauge 31. Incidentally, valve 57 is always closed except when chamber pressure is to be raised to atmospheric as described below.

The direction of air movement need not be the same as that shown in the diagram wherein air is expelled over the top of the load L. Alternatively, as shown in FIG. 2, and more fully described below, the direction of air flow may be altered by locating the air-mover 24 up at 25 to direct recirculated air into the top of the humidifier so that air leaving the humidifier may be directed under the floor or a false floor, of the vacuum chamber to force air below the load and then vertically upwardly through the load.

Referring back to FIG. 1, incoming air also may be directed to pass through branch conduit 23 to and through a vacuum regulator 32, and thence preferably through check valve 26, to humidifier 11, bubbling through the water reservoir 12, if desired, before comingling with the recirculating air in the upper part of the humidifier. Regulator 32, which may be conventional diaphragm type, continuously senses the pressure within the vacuum chamber through a line 29 and compares this to atmospheric reference pressure, allowing just enough air as shown by flowmeter 42 to enter humidifier 11 to maintain a set difference between the chamber and atmosphere. To maintain pressure within the vacuum chamber at an absolute rather than relative value, it is necessary to establish an absolute reference pressure in the regulator. This can be accomplished by having a sealed, absolute vacuum in a vessel, not shown, as the reference pressure, or by using such an absolute pressure regulator, not shown, to establish an absolute pressure in the reference side of regulator 32 which is lower than any anticipated atmospheric pressure but higher than the desired pressure intended to be maintained in chamber 10 as indicated by absolute pressure gauge 33. Absolute pressure regulation is not highly essential in stationary facilities, but is recommended in transportable containers which are likely to encounter severe and frequent fluctuations in atmospheric pressure.

Air entering humidifier 11 through conduit 23 is humidified as it bubbles through the water 12 and/or is exposed to water spray from conventional siphon-fed pneumatic spray atomization nozzle 35. The nozzle is actuated by the pneumatic force and motion of atmospheric air as it expands, flows and decreases in pressure to lift water to the nozzle in conduit 36 and eject the water into the air and water vapor space 13 of the humidifier above the water 12. In-line water filter 37 prevents clogging of the nozzle. Air is supplied to the nozzle through parts 38 and 39 of conduit 16. The rate of air and water utilization by the nozzle depends upon the pneumatic force applied, which can be adjusted by valve 40 to a desired pressure, as read on a vacuum gauge 41. Relatively small amounts of air are consumed in a spray nozzle so numerous nozzles can be used if required. Alternatively, hydraulic atomizing nozzles may be used, in which case, a water pump, not shown, would be required to circulate water to the nozzles from the reservoir 12 in the humidifier 11.

As discussed above, evaporative cooling causes the water temperature in humidifier 11 to tend to be lower than the air temperature in chamber 10, thereby lowering the humidity in the chamber. My preferred solution to this problem is to heat the the water. In the preferred embodiment shown in the drawing, the water 12 is heated by an electric immersion heater 47 responsive to a thermostat 48 and water temperature sensing element 49, so that the water temperature can be held at any desired value. To attain desired relative humidity in the chamber 10, I prefer that the water be kept at or about 2° to 20°C warmer than the temperature of the air in the chamber. The exact temperature for optimum humidity depends to considerable extent upon the amount of air recirculation and re-humidification through the humidifier, and the efficiency of the humidification process.

When valve 30 is closed so that no air recirculation occurs, all air enters the chamber through conduits 23, 38 and 39. If valve 40 is also closed, so that the spray nozzle 35 cannot function, the efficiency of the humidification process will be reduced to the single pass of air bubbling through the water 12. Consequently the temperature of water 12 will have to be raised relatively high above chamber air temperature to provide saturated or satisfactory humidity in the chamber. If the spray nozzle 35 is also operated by opening valve 40, the water temperature can be adusted to a lower value, and if the air-mover 24 is also operated by opening valve 30, a still lower water temperature will suffice to achieve saturated or satisfactory humidity in the chamber.

An additional heater 61 located in conduit 36 is made responsive to temperature sensing element 62 by the thermoregulator 63. This heater serves to warm the water entering the spray nozzle 35 to a desired temperature. When evaporative cooling is sought or employed to cool, or help cool, the vacuum chamber 10, the water temperature in reservoir 11 should be lower than the air temperature in the chamber. Then to maintain desirable relative humidity the water ejected from the spray nozzle is heated to a higher temperature than the air in the chamber.

Similarly relative humidity can be controlled and held at values lower than 100 %, by setting the water temperature to the relatively cool value required to maintain the desired lower humidity. Control of the humidity at a value slightly lower than 100 % has the advantage with some commodities that it decreases mold development without causing an unacceptable amount of desiccation.

It is possible to operate the apparatus at air temperatures even lower than minus 2°C without danger of freezing the water if the water temperature is raised more than 2°C by adding heat. A non-volatile antifreeze compound ca be mixed with the water to prevent freezing during periods of inoperation, and a desired humidity still can be attained in spite of the additional lowering of the vapor pressure of the water in the humidifier caused by the dissolved solute. This is accomplished by raising the water temperature to a higher value than otherwise would be necessary in the absence of the antifreeze compound.

Humidification is improved by continuously recirculating at least part of the air in chamber 10 through the humidifier. Water evaporated from the humidifier is replaced from an external source through conduit 52 as required. In a preferred method of water replenishment, the entry of water through an inlet conduit 52 is made responsive to a standard float leveling device 53 which senses or equals the water level in humidifier 11. Air pressure equalizing bypass line 54 connects water level device 53 with chamber 10. To avoid accumulation of salt, scale and other impurities in the water 12 of the humidifier due to continued water evaporation, water entering at 52 should be purified, for example by passage through a reverse osmosis membrane and/or deionizing resins of the mixed bed type. Impure water should be removed as may be necessary from time to time, as by a positive displacement pump 65 via conduit 66. Removal is facilitated during intervals when the pressure in chamber 10 is raised to atmospheric as taught above.

The humidifier need not be located within the vacuum chamber so long as its substantial function and results as herein described are preserved. If it is located externally to the vacuum chamber and appropriately connected therewith, it and all associated parts and connections should be insulated and constructed to withstand atmospheric pressure. Placing the humidifier outside the vacuum chamber is convenient in that this permits easy access at atmospheric pressure to the humidifying and air-moving equipment, for control thereof and attendance thereupon. When, however, atmospheric air is admitted to the chamber periodically attention to the equipment is greatly facilitated within the chamber.

To raise the pressure in chamber 10 to atmospheric and to open the chamber for access, valve 14 in line 15 and valve 56 in line 16 are shut, vacuum pump P is stopped, and valve 57 in bypass line 58 and valve 59 in conduit 60 are opened. Valve 59 admits atmospheric air and pressure to the chamber 10. Valve 57 admits air at chamber pressure to the line between check valve 26 and regulator 32. Conventional, automatic timing and control apparatus, not shown, may of course, be employed to start and stop the pump and open and close the valves to effect any desired and selected cycle and change in pressure in the container.

FIG. 2 illustrates another preferred apparatus for carrying out my hypobaric storage methods and improvements in which there are differences with respect to the apparatus of FIG. 1 that will presently appear. Air-mover 71 corresponding to air-mover 24 is operated by incoming air in line 22 as in FIG. 1. However, air-mover 71 discharges into an upper portion of the humidifier 70 and induces air from the upper levels of chamber 10 to or toward the humidifier and at or across an adjustable damper or baffle 72 which is disposed to admit all or part of the air emitted by air-mover 71 to the upper space 13 of the humidifier 70 or divert all or part of such air downwardly into the pipe 73 to the lower part of the chamber 10 beneath the load L of stored material 45 therein. Air leaves the humidifier 70 through a side port 74 into a conventional filter-mist eliminator 75 which spins out entrained water droplets. The water collects at the bottom of the eliminator 75 and drains by gravity back to the water supply 12 through conduit 76. Air leaves the filter-mist eliminator 75 through conduit 77, rejoining in conduit 73 the air, if any, which bypassed the humidifier. A fraction of the moving air 78 is withdrawn from the chamber 10 by vacuum pump P through outlet conduit 15, and the remainder is drawn to the air-mover 71 via inlet 79 to continue recirculation. If all of the recirculating air emitted by air-mover 71 were directed through humidifier 70 and should the air-mover and humidifier be of sufficient capacity, the air could cause an undesirable carry-over of entrapped water droplets from the humidifier. To control this, baffle 72 is provided to divert part of the recirculating air around the humidifier.

In FIG. 2, heat exchanger 20, line 15, and pipe 16 near the exchanger may be insulated as at 80. I have found that impure water may be drained conveniently from the reservoir during periods of inoperation when the vacuum in chamber 10 has been released as by draining line 51 through conduit 81 and valve 82. In the form of my apparatus in FIG. 2, I prefer not to use the check valve 26 in line 23 as shown in FIG. 1, but instead dispose the regulator 32 in extended aspects of lines 23 and 29 to a higher elevation than the water level in the humidifier 70 as shown at the left of FIG. 2.

The moisture content of the air in chamber 10 is measured by device 85, which may be any type of conventional relative humidity indicator insensitive to atmospheric pressure. For example, a wet and dry bulb resistance or other type of thermometer, or a membrane actuated hygrometer may be used. I prefer an electronic dew point indicator having a heated, wire wound, salt coated bobbin 83 as a sensor, and a thermister probe 84 to measure the air temperature in chamber 10. If desired, the moisture content of the air in chamber 10 can be continuously controlled by making heaters 61 and/or 47 responsive to moisture sensing device 85, conveying signals from device 85 through, supplementing and/or superceding thermostats 63 and 48 respectively, via line 86 upon closing switch 87 for that purpose.

Storage of MAM at my newly discovered low absolute pressures taught herein facilitates diffusive escape of vapors such as carbon dioxide, ethylene, farnescene, ethanol, acetaldehyde, and various metabolic waste products produced within plant material, as well as various putrefying odors produced within or upon animal matter. Low absolute pressure of air also decreases the partial pressure of oxygen available to support metabolic activity, and tends to prevent oxidation of myoglobin and hemoglobin to metmyoglobin and methemoglobin. The growth of aerobic bacteria and certain molds is retarded, and various undesirable animal forms, such as insects and nematodes, which sometimes infest and develop in stored animal and plant commodities, may be destroyed both by lack of oxygen and hypobaric pressure.

The number of chamber volumes of air passed per hour through the storage chamber is ordinarily not critical, except for the cost of pumping, provided it is sufficient to prevent accumulation of undesired vapors in those cases when such vapors diffuse from the matter. Rapid recirculation of air internally within the chamber even as often as 300 times per hour improves heat exchange to and from the stored MAM. During usual operation through-put of air ranges preferably from about ¼ to 10 chamber volumes per hour regardless of the rate of internal air recirculation.

While I have disclosed preferred forms of methods of and means for practicing my inventions, other forms and embodiments may occur to those skilled in the art who come to know and understand my inventions, all without departing from the essence and substance thereof. Therefore I do not want my patent to be restricted merely to that which is specifically disclosed herein, nor in any other manner inconsistent with the progress by which the art has been promoted by my improvement.

I claim:

1. The method of preserving metabolically active matter comprising placing said matter in air in an enclosed space, maintaining the relative humidity of said air between about 80 and 100%, adding fresh air to and moving humid air from said space, controlling the temperature of said matter, maintaining the pressure of said air between about 4 mm. Hg. and 100 mm Hg. absolute, and correlating pressure, temperature, air movement and relative humidity in said space with respect to the nature of the particular matter being preserved.

2. The method of claim 1 wherein the air temperature is maintained between about minus 1° and plus 13°C.

3. The method of claim 1 wherein the stored matter comprises animal products such as beef, chicken, pork, shrimp and fish; vegetative materials and floral crops such as potted chrysanthemums, potted azaleas and Easter Lilies, rooted and non-rooted chrysanthemum cuttings, rooted and non-rooted carnation and geranium cuttings; cut flower such as snapdragon, carnation, roses, chrysanthemums and gladiolus; and green onions, apples, pears, nectarines and peaches, and the air temperature is maintained between about minus 1° and plus 4°C.

4. The method of claim 3 wherein the stored matter comprises said animal products and the pressure is maintained between about 8 mm and 50 mm Hg.

5. The method of claim 1 wherein the stored matter comprises mature green tomatoes, avocados, green peppers, cucumbers, snap and pole beans, red ginger, helicania latispathea, and vanda joaquim, and the temperature is maintained above about 5°C and below about 13°C.

6. The method of claim 1 with the steps of cooling said air and recirculating cool humid air over and about said matter.

7. The method of claim 1 with the step of wrapping said matter with material tending to retain water vapor in the space between the surface of said matter and said material.

8. The method of claim 1 with the steps of maintaining said hypobaric conditions predominately and raising the air pressure to a value between about 100 mm Hg. and 760 mm Hg. periodically.

9. The method of claim 1 with the step of humidifying said air by adding water thereto at a temperature not substantially less than the temperature of the air in said space.

10. The method of preserving metabolically active matter comprising placing said matter in air in an enclosed space, maintaining hypobaric storage conditions of about 4 to 400 mm Hg. and predetermined related conditions of temperature, hypobaric pressure, relative humidity and air flow correlated to preserve said matter in said space at certain times, and maintaining conventional cold storage conditions in said space at other times to alleviate undesirable adaptation of said matter to the low oxygen environment of said hypobaric storage conditions.

11. The method of claim 10 wherein said conditions are modified cyclically.

12. The method of claim 10 wherein said cold storage conditions are maintained for about 1 to 14 hours per day at least on certain days.

13. The method of cooling metabolically active matter rapidly in air composed of gases and water vapor in an enclosed space at sub-atmospheric pressure comprising the steps of reducing the pressure of said air to between 4 and 100 mm Hg., cooling said air, increasing the thermal conductivity of said air by increasing the relative humidity thereof to between 80 and 100%, simultaneously increasing the relative proportion of water vapor to said gases in said air, and moving said cold, hypobaric, heat conductive mixture over said matter in thermal contact therewith.

14. The method of claim 13 wherein said matter is cooled rapidly to a temperature different from its desired steady-state storage temperature with the step of increasing the temperature and pressure employed for rapid cooling to the temperature, humidity and pressure desired for steady-state storage.

15. The method of claim 13 with the step of temporarily interrupting the said conditions employed for cooling the matter rapidly by increasing the temperature and pressure thereof to preserve said matter from cold damage, freezer burn, or anaerobiosis during the cool-down process.

16. The method of claim 13 with the step of wrapping said matter with material tending to retain water vapor in the space between the surface of said matter and said material.

17. The method of claim 13 wherein said matter has a water content with the step of reducing the pressure in said space as the temperature of said matter is reduced.

18. The method of preserving metabolically active matter other than mature, but less than fully ripe, fruit which produces ethylene and is ripened thereby, in an enclosed space in moving hypobaric air at 4 to 400 mm Hg. comprising maintaining predetermined related conditions of temperature, hypobaric pressure, relative humidity and air flow co-related to preserve said matter, adding fresh air to and withdrawing humid air from said space, providing a supply of water, adding water vapor to said fresh air from said supply, and maintaining the temperature of said supplied water substantially as warm as the temperature of said air.

19. The method of claim 18 in which the temperature of water in said body of water is 20°between about 2° to 20 C higher than the temperature of the air in said space.

20. The method of claim 18 in which humid air is taken from and fresh air is added to said space, with the step of preconditioning said air entering said space to a temperature, pressure and humidity proximate the corresponding conditions in the air in said space.

21. The method of claim 18 in which said heated water is introduced into said air through an hydraulic water atomizer with the step of exposing the water supply to atmospheric pressure to force the water into said space.

22. The improvement of claim 18 with the steps of removing low pressure air from, and supplying higher pressure fresh air to, said space, humidifying part of said air on its way to said space, and inducing circulation of humid air within said space by the movement of another part of said air into said space through a pneumatically actuated air mover.

23. The method of claim 18 with the step of wrapping said matter in water-retention means enclosing said matter and retarding water-loss therefrom and enhancing heat transfer therefrom.

24. The method of claim 18 with the step of cooling said organic matter by progressively decreasing the pressure of said air as the temperature of said commodity is lowered.

25. The method for preserving metabolically active matter other than mature, but less than fully ripe, fruit which produces ethylene and is ripened thereby comprising:
   a. placing said matter in air in an enclosed space,
   b. humidifying said air,
   c. moving said humid air in said space in contact with said matter,
   d. maintaining hypobaric pressure in said space within the range of about 4 mm Hg. to about 400 mm Hg., maintaining the air temperature in said space from about minus 2° to about 15°C, maintaining the relative humidity in said air between about 80 and 100%, and exhausting air from said space at a rate between one-fourth to ten times the volume of said space at the reduced pressure thereof per hour,
   e. said hypobaric pressure, humidity, air flow and temperature being dependent upon the nature of said matter and co-related to preserve said matter for a prolonged period of time, as compared with conventional cold storage, and
   f. recirculating said air in said space.

26. The method of claim 25 in which said matter comprises non-ripe fruits such as limes, pineapples, peaches and nectarines, said pressure is from about 80 to about 150 mm Hg., and said temperature is within the range of about 0° to about 10°C.

27. The method of claim 25 in which said matter comprises ripe fully mature fruit such as Valencia oranges, ruby red grapefruit, pineapples, strawberries, sweet cherries, vine ripe tomatoes and blueberries, said pressure is from about 70 to about 400 mm Hg., and said temperature is within the range of about 0° to about 14°C.

28. The method of claim 25 in which said matter comprises iceburg lettuce, said pressure is from about 80 to about 200 mm Hg., and said temperature is within the range of about 0° to about 2°C.

29. The method of claim 25 including providing water retentive means substantially enclosing said matter to retard water loss therefrom and increase heat transmission therefrom.

30. The method of claim 25 wherein said matter comprises animal products with the steps of maintaining said temperature between about minus 1° and plus 2°C and maintaining said pressure between about 8 and 50 mm Hg.

31. The method of claim 25 with the steps of maintaining said hypobaric conditions for a period of time, and modifying said conditions from time to time.

32. The method of claim 31 wherein said conditions are modified from hypobaric to cold storage.

* * * * *

UNITED STATES PATENT AND TRADEMARK OFFICE
CERTIFICATE OF CORRECTION

PATENT NO. : 3,958,028
DATED : May 18, 1976
INVENTOR(S) : Stanley P. Burg

It is certified that error appears in the above-identified patent and that said Letters Patent are hereby corrected as shown below:

Col. 3, line 25, erase the first "c" in -- ccontrolled --; line 52, erase last "c" in -- diagrammaticc --.
Col. 5, line 50, change "fact" to -- another --; same line, change "hypobaric conditions" to read -- exhibit. -- ; line 66, change "another" to read -- same --; same line change "exhibit" to read -- pressure --.
Col. 13, line 13, change "sever" to read -- severe --; line 14, change "hypobaraic" to read -- hypobaric --.
Col. 17, line 52, after the period, erase "vapor tends to"; line 58 correct spelling of vaopr" to read -- vapor --.
Col. 18, line 25, correct spelling of "carbor" to read -- carbon --
Col. 19, line 57, correct spelling of "nw" to read -- new -- .
Col. 20, line 26, change "thermal" to read -- therein -- .
Col. 21, line 11, change "than" to read -- then --; line 41, after "10°," insert -- C --.
Col. 25, line 5, correct spelling of "ca" to read -- can --.
Claim 3, line 42, change "flower" to read -- flowers --.
Rewrite Claim 19 to equal allowed Claim 19 as follows:

"19. The method of claim 18 in which the temperature of of water in said body of water is maintained between about $2°C$ to $20°C$ higher than the temperature of the air in said space."

Claim 24, lines 22 & 23, change "commodity" to read -- matter -- .

Signed and Sealed this

Thirty-first Day of August 1976

[SEAL]

Attest:

RUTH C. MASON
Attesting Officer

C. MARSHALL DANN
Commissioner of Patents and Trademarks